(12) United States Patent
Meoli

(10) Patent No.: US 9,620,989 B2
(45) Date of Patent: Apr. 11, 2017

(54) RECHARGEABLE BATTERY ACCESSORIES

(71) Applicant: Blackbird Tech LLC, Boston, MA (US)

(72) Inventor: Michael J. Meoli, Bridgewater, MA (US)

(73) Assignee: BLACKBIRD TECH LLC, Boston, MA (US)

( * ) Notice: Subject to any disclaimer, the term of this patent is extended or adjusted under 35 U.S.C. 154(b) by 156 days.

(21) Appl. No.: 14/208,121

(22) Filed: Mar. 13, 2014

(65) Prior Publication Data

US 2014/0266000 A1   Sep. 18, 2014

Related U.S. Application Data

(60) Provisional application No. 61/779,212, filed on Mar. 13, 2013, provisional application No. 61/837,717, filed on Jun. 21, 2013, provisional application No. 61/861,731, filed on Aug. 2, 2013, provisional application No. 61/924,449, filed on Jan. 7, 2014.

(51) Int. Cl.
| H02J 7/00 | (2006.01) |
| H02J 7/02 | (2016.01) |

(52) U.S. Cl.
CPC ............ *H02J 7/027* (2013.01); *H02J 7/0045* (2013.01); *H02J 7/0055* (2013.01); *H02J 7/0065* (2013.01); *H02J 2007/005* (2013.01)

(58) Field of Classification Search
CPC ......... H02J 7/027; H02J 7/0055; H02J 7/0065
See application file for complete search history.

(56) References Cited

U.S. PATENT DOCUMENTS

| 7,619,388 | B1* | 11/2009 | Nana | H01M 2/1066 320/114 |
| 2010/0244769 | A1* | 9/2010 | Sakakibara | H01M 2/1016 320/118 |
| 2013/0183562 | A1* | 7/2013 | Workman | H01M 2/204 429/100 |

* cited by examiner

*Primary Examiner* — Vuthe Siek
(74) *Attorney, Agent, or Firm* — Onello & Mello, LLP

(57) ABSTRACT

A plurality of battery pack accessories are presented. The accessories include a battery power gauge adapted to be applied to a battery pack and provides a visual indication of the state of the charge in the battery pack, a light adapted to the battery pack such that the battery pack can be used as a flashlight when needed, a connector (e.g., a Universal Serial bus (USB) connector) that can be used for charging the battery pack or to allow the battery pack to charge a device.

20 Claims, 15 Drawing Sheets

FRONT

RECHARGEABLE BATTERY ACCESSORIES

CROSS REFERENCE TO RELATED APPLICATIONS

The present application claims the benefit of U.S. Provisional Patent Application No. 61/779,212, filed on Mar. 13, 2013; U.S. Provisional Patent Application No. 61/837,717, filed on Jun. 21, 2013; U.S. Provisional Patent Application No. 61/861,731, filed on Aug. 2, 2013; and U.S. Provisional Patent Application No. 61/924,449, filed on March Jan. 7, 2014; all of which are incorporated herein by reference in their entirety.

BACKGROUND

Rechargeable battery packs, especially the type designed for power tools such as drills, saws and sanders have become common place. The battery packs can come in different voltages and current ratings and may be interchangeable with other battery packs, such that when the charge from one is exhausted, another charges battery pack can be used. The battery powered tools are particularly useful for new construction where power has not been installed yet, situations where the power is out and remote locations where power is not available.

SUMMARY

Conventional battery packs for power tools, such as those explained above suffer from a variety of deficiencies. One such shortcoming is not being able to tell how much charge a battery pack currently has. Another problem is that these battery packs should not be limited to only being used with power tools. Yet another problem is trying to charge a device with a conventional charger such as a car charger, USB charger or solar charger.

Embodiments of the invention significantly overcome such deficiencies and provide mechanisms and techniques that provide increased use for a power tool battery pack.

In a particular embodiment of a battery pack accessory, a battery power gauge is adapted to be applied to a battery pack and provides a visual indication of the state of the charge in the battery pack.

Other embodiments include a light adapted to the battery pack such that the battery pack can be used as a flashlight when needed. This can help provide light while using the power tool having the battery pack with the light installed in the tool. Further, the battery pack can be used as a standalone flashlight without being installed in the tool.

Still other embodiments include a battery pack having a connector (e.g., a Universal Serial bus (USB) connector) that can be used for charging the battery pack or to allow the battery pack to charge a device (including but not limited to a cellphone, a media player, a video game or the like). The port also allows the battery pack to be charged from different sources such as a vehicle lighter, a cable to a device (e.g. a laptop computer or the like), a solar panel and the like.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention. The drawings are not necessarily to scale, emphasis instead being placed upon illustrating the principles of the invention.

FIG. 10b provides a close-up view of one of the accessories depicted in FIG. 10a.

DETAILED DESCRIPTION

Figure 1:
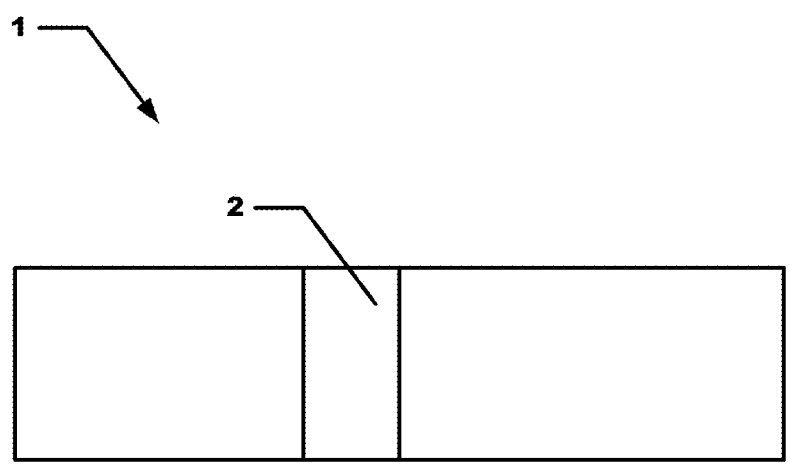
FIG. 1 shows an embodiment comprising a battery power gauge for installation on a battery pack.

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

Referring to FIG. 1, a particular embodiment of a battery power gauge 1 is shown. Gauge 1 is placed in mechanical communication with a battery pack and provides the user with an easy to read display of the power currently in the battery pack. Accordingly, the user can determine whether he needs to charge the battery pack, if the battery pack has previously been charged, if the user should switch out the battery pack with another having more power remaining, or if the user should bring along an additional battery pack should the current battery pack run out of power during use.

The battery power gauge 1 includes a manual slider 2, which the user can use to indicate the charge status of the battery. If the battery has been fully charged, the user would move slider 2 to a first position. If the battery power has been exhausted the user would move slider 2 to a second position. Accordingly, the user can determine visually whether the battery pack should be used or needs to be charged.

Figure 2:
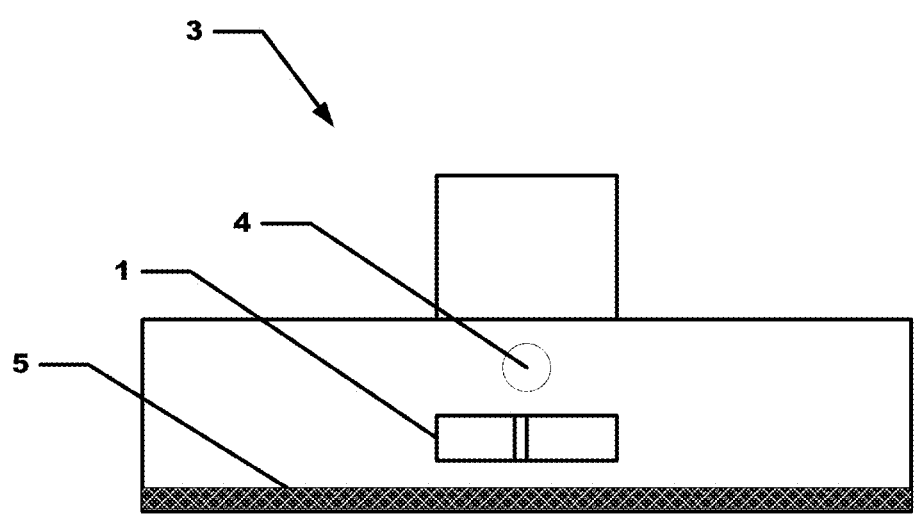
FIG. 2 shows another embodiment wherein a light is shown in electrical and mechanical communication with a battery pack.

Referring now to FIG. 2, another particular embodiment of a battery pack 3 is shown. Battery pack 3 includes a gauge 1, describe above, as well as a light 4. Light 4 serves to not only light a work area when the battery pack 3 is used with a power tool, but also allows the battery pack 3 to be used as a standalone flashlight. Battery pack 3 also include a magnetic area 5. Magnetic area 5 is useful foe holding or gathering screws, nails and the like. Magnetic area is also useful for attaching the battery pack 3 to any metal surface (table, ladder, vehicle, etc.).

The multi-color 4 stage led light on the front of a power tool battery which can be stationary, swiveled, jointed hinged mounted directly in front toward working or aiming areas. This light can be used as a flashlight alone which will illuminate the use of regular flashlight it will do away with battery purchases which and are not friendly to the environment. This eco-friendly solution to a flash light is the alternative to flashlights, work lights, safety lights. Rechargeable in 6 ways repaired and replaceable the attachment cradle is part of the lower port to be able to attach after equipment and accessories. The led light can be one color on its own two colors 3 stage 4 complete which eliminates other switches and led for battery power check.

Figure 3:
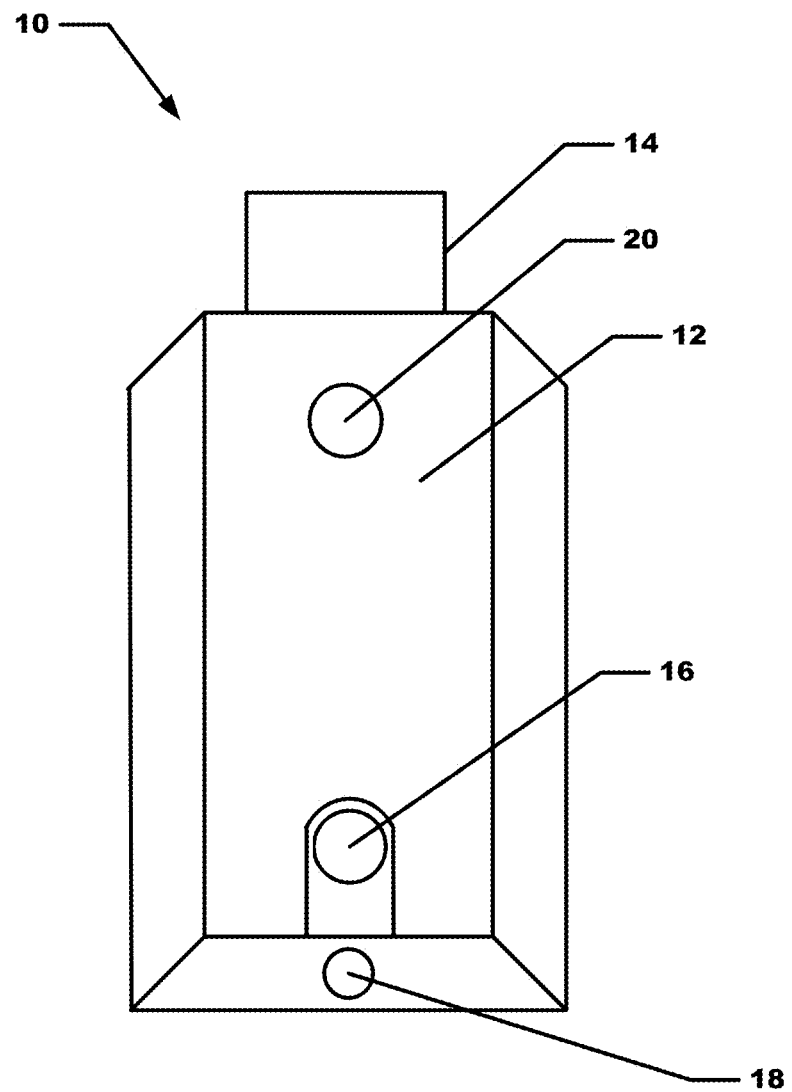
FIG. 3 shows a device having a connector, a battery power gauge and a light which is capable of being in removable electrical and mechanical communication with a battery pack.

Now one light does both tasks. Red low yellow medium green high white light the front mounted light, led, filament, neon, led, krypton, halogen, micro, plasma, solar any type of light attached inset molded, welded., imprinted, fused, clipped, melted, combined glued, on the front back forward of a power tool battery or accessory attachment is explained to not be replicated. The light installed in front of this product is to be an extra light or in construction with the tool light and or broken and or non-purchased a or a lower priced unit this light serves as a battery check also and or stand alone. Battery check with one switch for both 3 switches pattern This light can be inserted or a fixed to any brand any style. This light can just be extra light and or just its own light Standalone light anywhere and chargeable anywhere emergency charge, solar charge usb –usb charge, car charge, manufacturer charge, stack on charge, solar charge, 7 ways of charging The wording in this document considers with the documents only light service affixed in any way shape or for all possible on a power tool battery any shape form or style to be used for away such purpose and or at any such place or area to be charged in any ways or form possible to be protected and these documents of descriptions and or figures attached and explained by the provisional and or pending patents You need light anywhere place or form in the world and the universe even the rovers need light. Safety lights on accessories Referring now to FIG. 3, a battery pack accessory 10 is shown. Accessory 10 includes a case 12 having a connector 14 for mating with a corresponding port on a battery pack. Also shown is switch 16 for turning on and off the lights 18 and 20. Accessory 10 is shaped and sized to slide into a corresponding slot on a battery pack.

Figure 4:
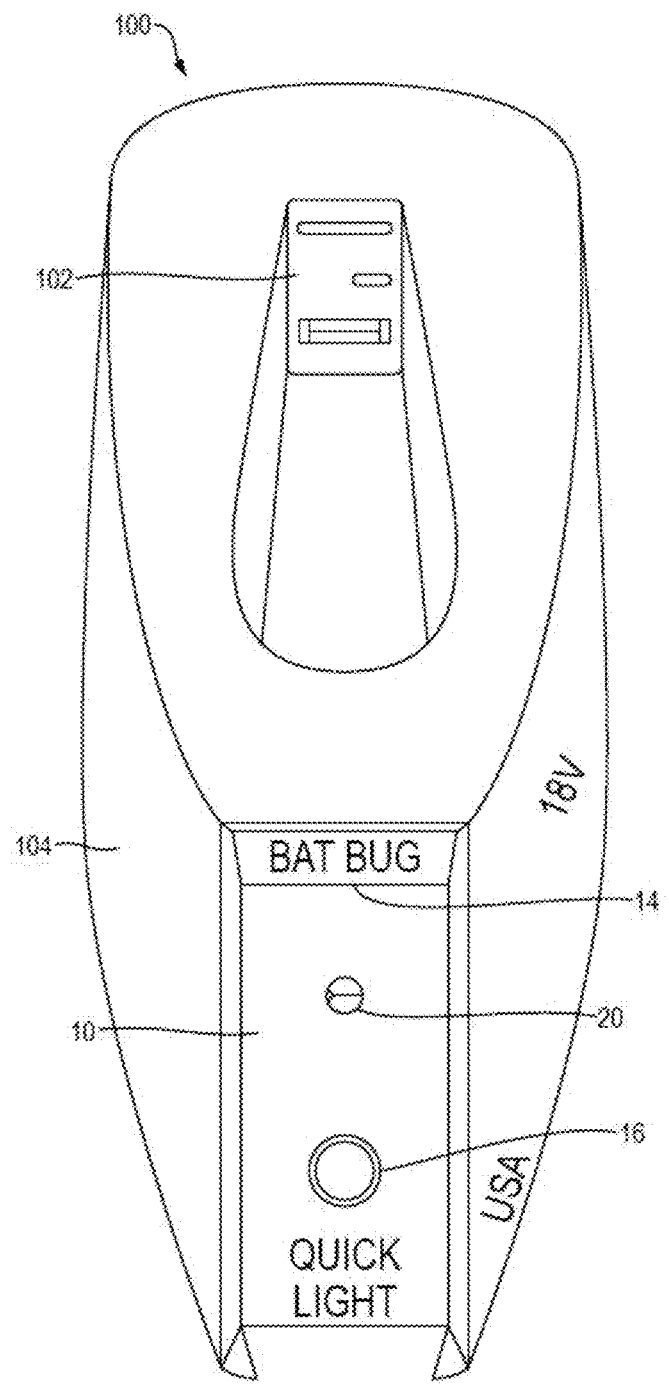
FIG. 4 shows the device of FIG. 3 installed in a battery pack.
Figure 5A:
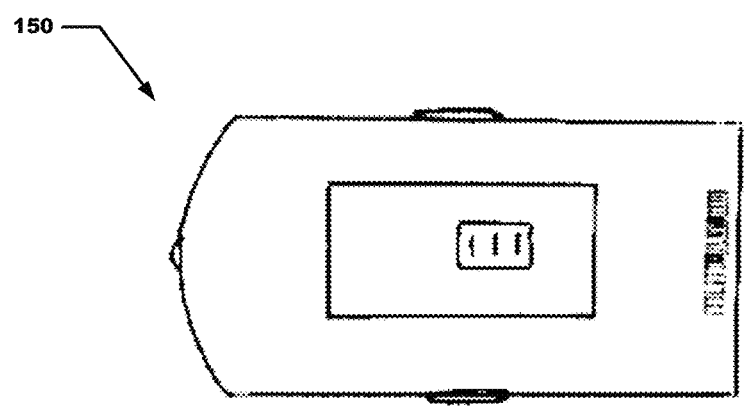
FIGS. 5A-5F show a rechargeable battery pack having front and rear USB connectors and a light which is adjustable to several different positions and angles.
Figure 5B:
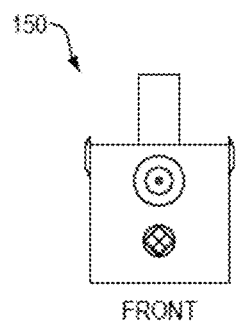
Figure 5C:
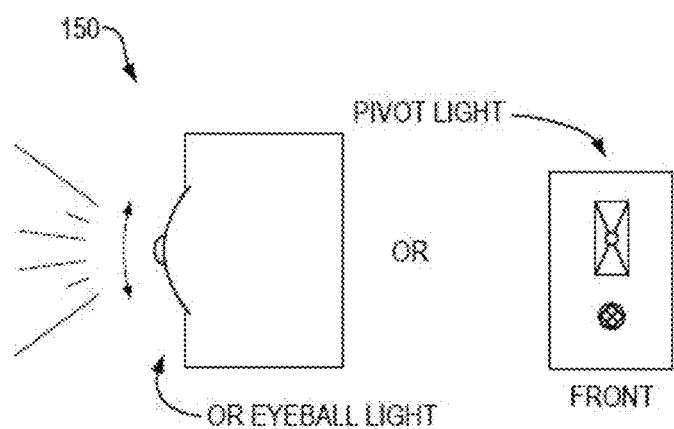
Figure 5D:
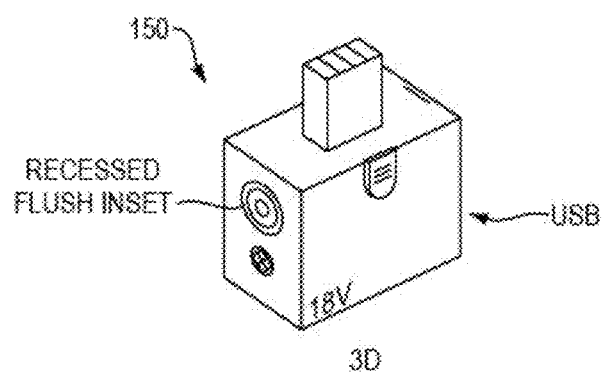
Figures 5E, 5F:
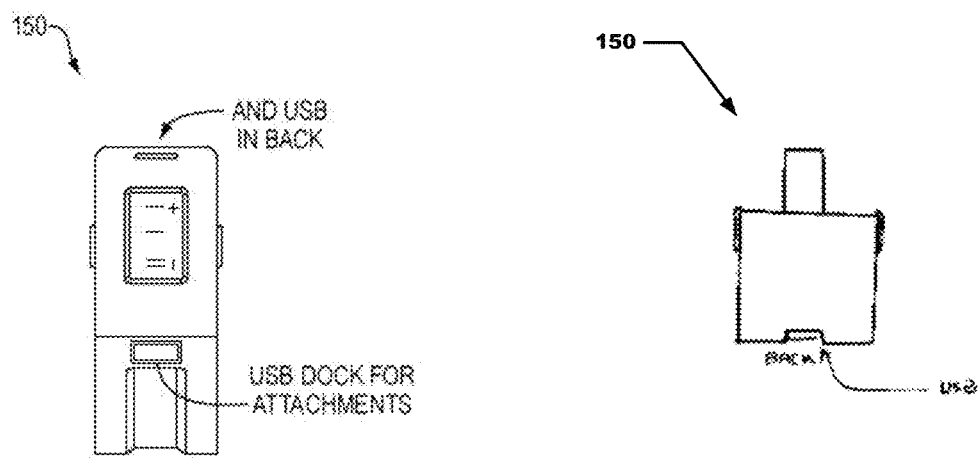

FIG. 4 shows the battery pack accessory 10 mounted in a battery pack 100. Battery pack 10 has case 104 and a power connector 102 for mating with a power tool. Battery pack 100 also has a slot that battery pack accessory 10 fits into.

Shown in FIGS. 5A-5F are various views of an assembly 150 which includes a rechargeable battery pack, front and rear USB connectors, and a light which is adjustable to several different positions and angles. The USB ports are capable of supporting a plurality of removable options. Options include, but are not limited to, a light; a level; a thermometer; a radio or other type of media player; a magnet, a camera (still pictures and/or video) and a motion alarm.

Usb port installed in a power tool battery array of options to be in ay part, area, zone, corner, crevice, side, top, bottom, front, back as well as the 110 volt any voltage converted to the household wattage to any page which is 100 HZ to 110 to 115 max 120 volts current. Household only invention from 12 volt dc direct current from battery of 12v, 18v, 20v, 24v and or greater and no less than 12 v and the regulation on 110 volt inversion on any power tool. Battery in any way shape or form. To be installed in any area top, side, bottom, front, male, female and of any power tool battery for any battery to use as a power source for a tool paved by it which stand as alone and or in conjunction on top of a other to become male and female ends top and bottom. To have parallel power to and or in services battery power to invert or divert to the top of the accessory heads to jump another battery as of a car battery 12 volt 18 volt as a jump pack to start as the batteries can be stack on each other to create the multiple power desired to cause such and power forced to jump start another the opposite or the lower paired.

Multiple batteries stacked each other is the which is the area is expandable. This option and installation is what the possibilities are stacked on 2 stages 2; layers inverter use port and or 5 ma to 1 full amp of power.

So 1 amp to 12 volts to 100 v from the 110 volt inverter incorporated into a 12 volt power tool battery.

The batteries able to be stacked onto each other within male female tops and bottoms in any way shape or form. The simple action of attaching 2 batteries back to back and to be able to flip them around to each other did also leave as a port to carry an extra one attached The concept leaves endless possibilities it renewable and eco-friendly and recyclable this saves the planet and the area chargeable batteries area repetitive buying frenzy. Not only every year the repurchased but there in technology battery life and power but buy the better product will mean end your can built without tools.

Figure 6:
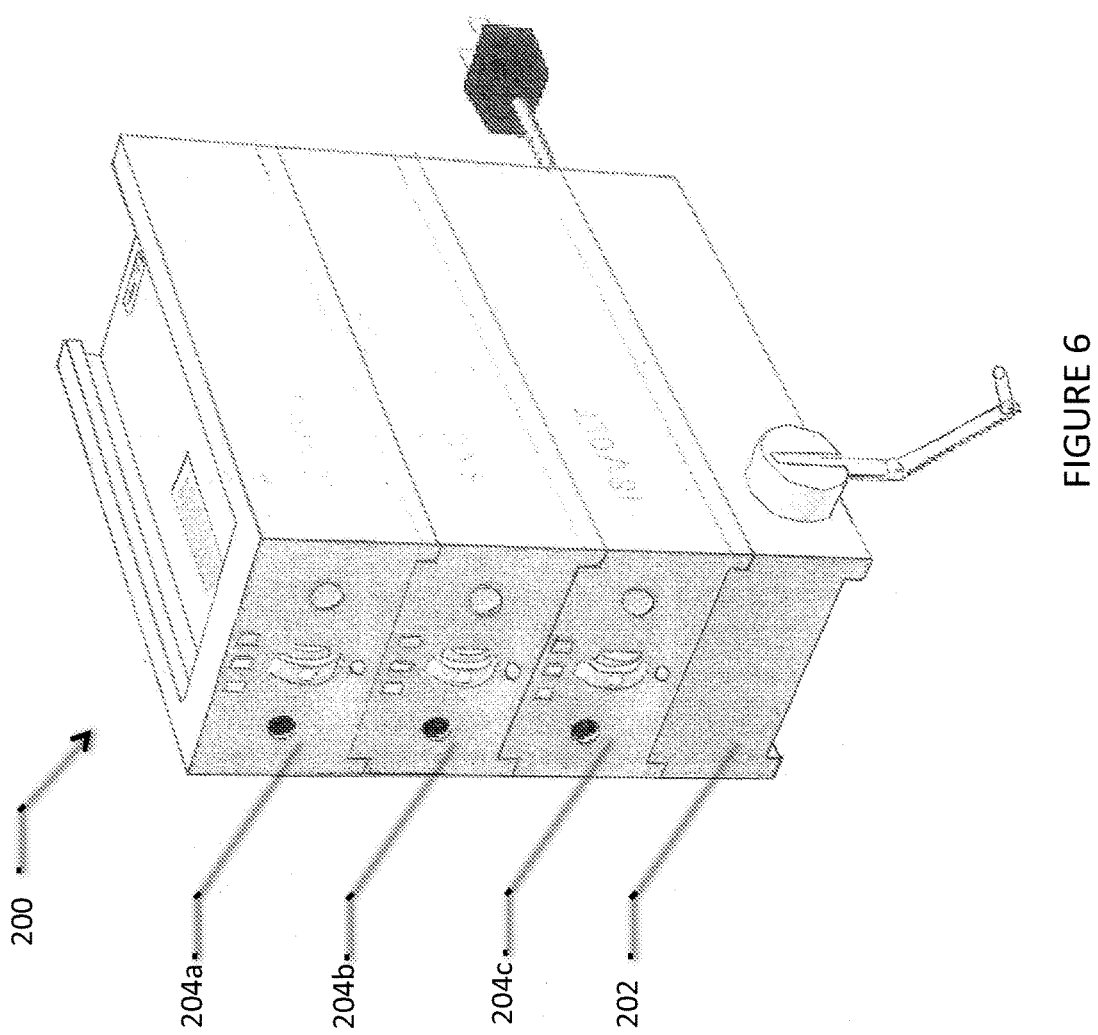
FIG. 6 shows a set of stackable battery packs.
Figure 7A:
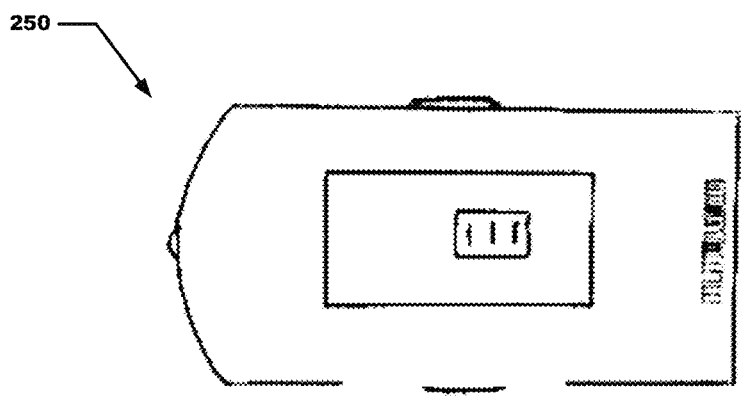
FIGS. 7A-7F show a rechargeable battery pack having front and rear USB connectors and a light which is adjustable to several different positions and angles.
Figure 7B:
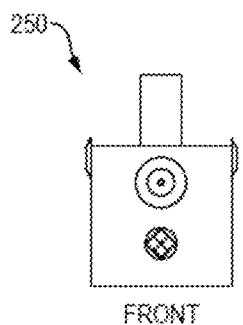
Figure 7C:
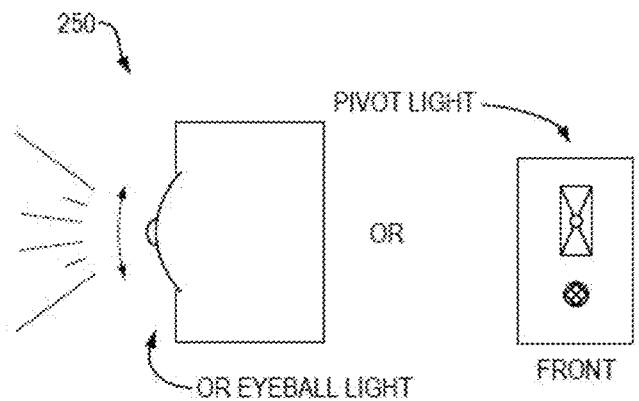
Figure 7D:
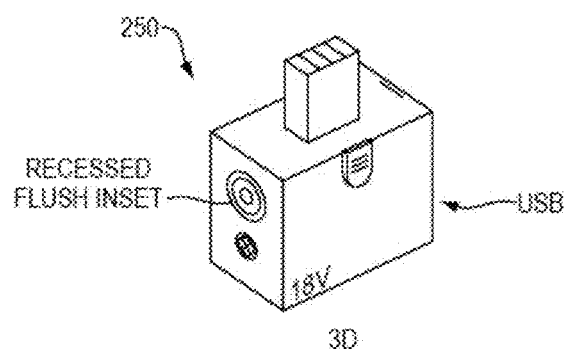
Figures 7E, 7F:
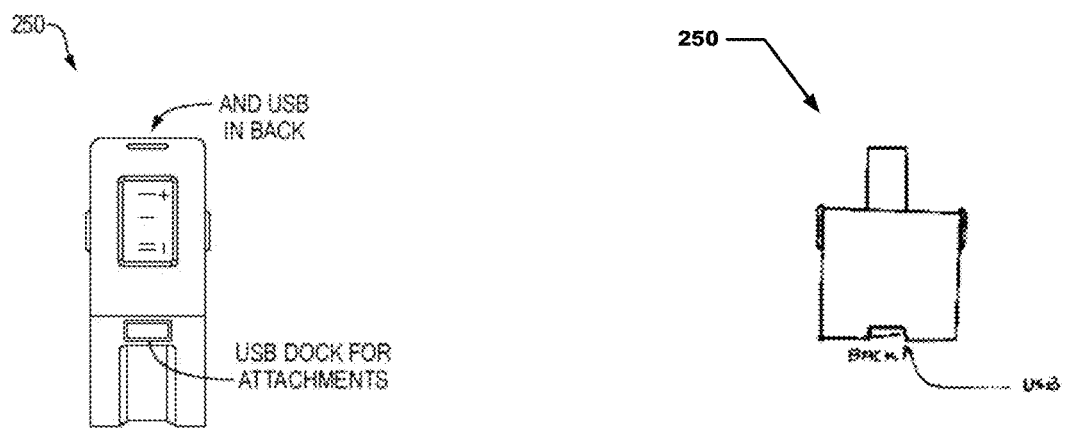

FIG. 6 shows a set 200 of stackable rechargeable battery packs 204a, 204b and 204c using a single battery charges 202. In such a manner a plurality of battery packs can be charged while only a single battery charger. The above described inventions provide several advantages over conventional devices. The above device saves time by indicating a current charge of a battery pack, by providing light when used with a power tool or as a standalone flashlight, and allow the battery pack to be charged by a plurality of different devices as well as providing charge to a plurality of devices. This will save time, the number of chargers needed and the number of batteries used in a household.

Shown in FIGS. 7A-7F are various views of an assembly 250 which includes a rechargeable battery pack, front and rear USB connectors, and a light which is adjustable to several different positions and angles. The USB ports are capable of supporting a plurality of removable options. Options include, but are not limited to, a light; a level; a thermometer; a radio or other type of media player; a magnet, a camera (still pictures and/or video) and a motion alarm.

Figure 8:
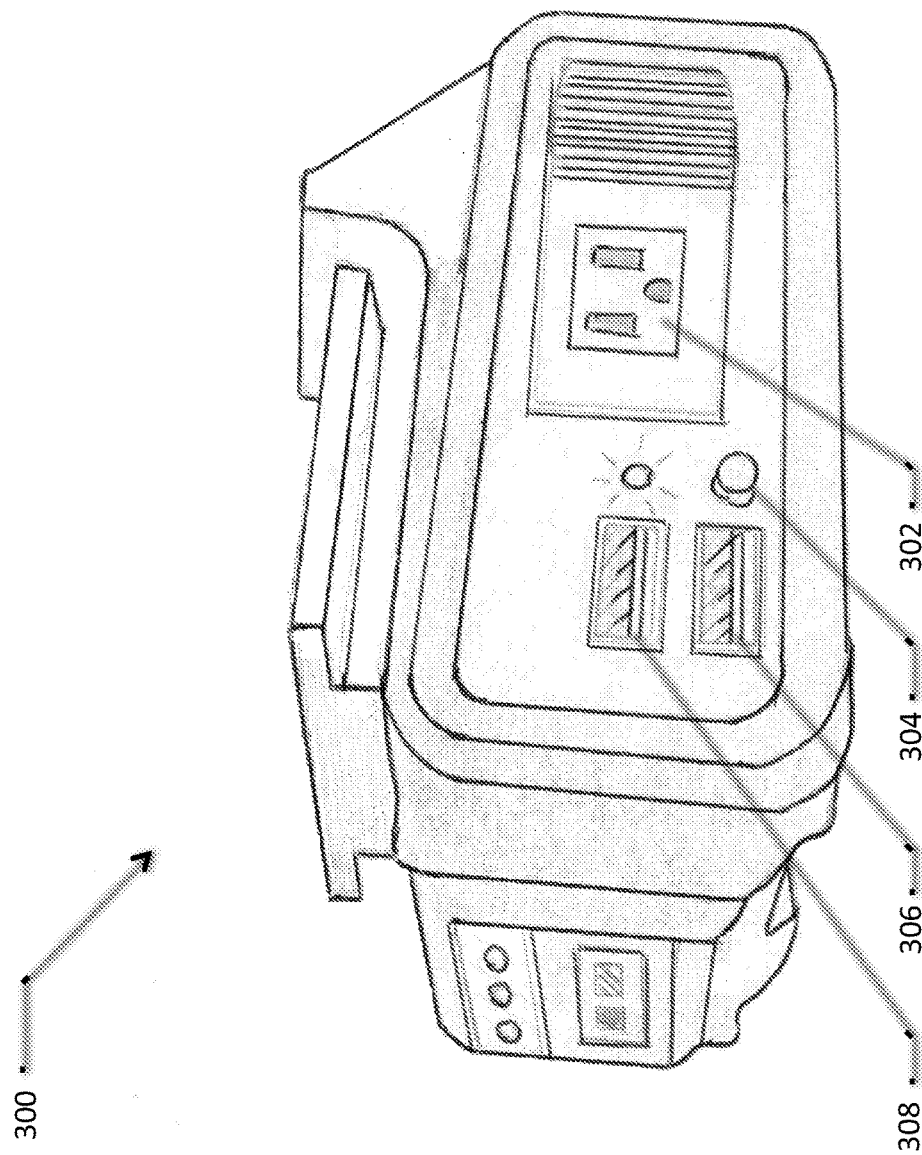
FIG. 8 depicts a view of a battery pack having an A.C. power plug in accordance with embodiments of the invention.

Referring now to FIG. 8, a particular embodiment of a battery pack 300 is shown. Battery pack 300 includes an A.C. connector 302. The battery pack 300 includes a D.C. power source internally which is in electrical communication with a power inverter. The output of the power inverter is an A.C. voltage, available at A. C. plug 302. Also shown are on/off switch 304 and first and second USB connectors 306 and 308.

Figure 9:
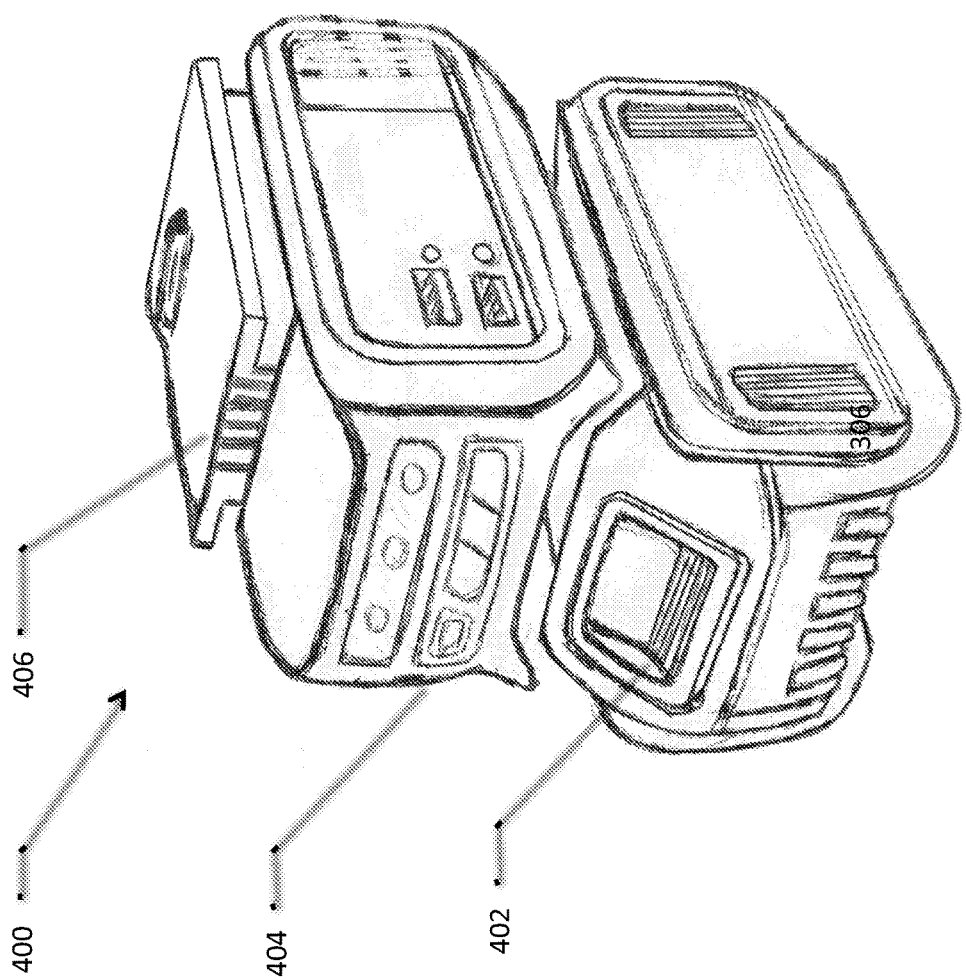
FIG. 9 shows a pair of battery packs stacked together.

Referring now to FIG. 9, a battery pack configuration 400 is shown. Configuration 400 includes a first battery pack 402 and a second battery pack 404. Battery pack 404 shows a mechanical and electrical connector 406. Battery pack 402 includes a similar mechanical and electrical connector as connector 406. The first battery pack has its connector mated with a corresponding receiving connector on the bottom of battery pack 404 to place the two battery packs in mechanical and electrical communication. In such a manner multiple battery packs can be connected together.

Figure 10A:
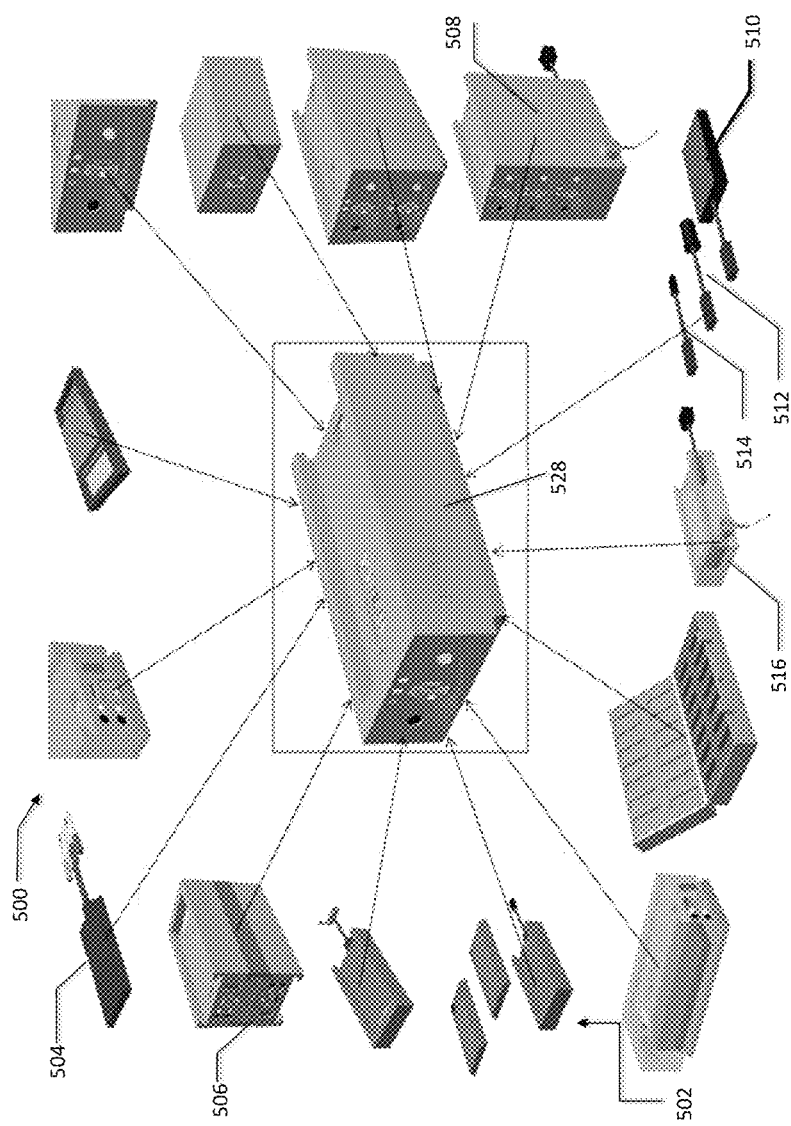
FIG. 10a depicts a view of a battery pack having several options including various battery arrangements, various battery pack accessories and various battery pack charging options.

Referring now to FIG. 10a, a particular embodiment 500 of a battery pack and various battery arrangements, various battery pack accessories and various battery pack charging options are shown. In particular, a battery pack undercarriage 502 is shown. The battery pack undercarriage allows the battery pack to interface with a variety of accessories, such that the battery pack functions as a tool with a variety of options. The undercarriage has a mechanical communication interface between the battery pack and a variety of accessories including other battery packs; tools such as a strobe light, laser level, camera, video recorder and the like; and charging devices.

Figure 10B:
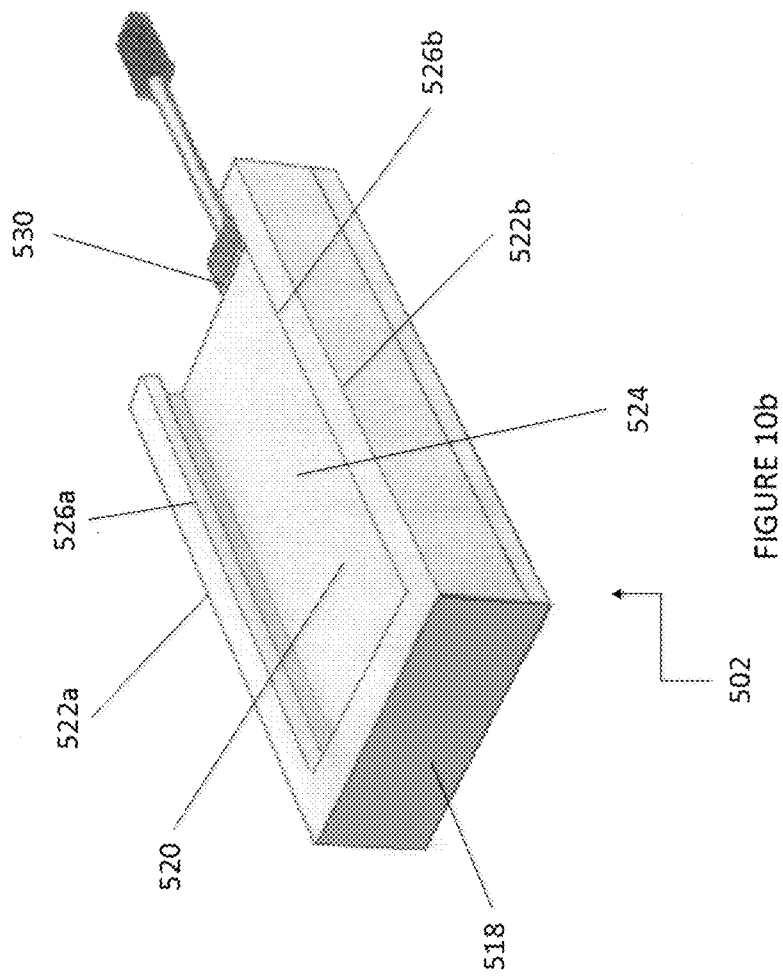

With reference to FIG. 10b, undercarriage 502 comprises a housing 518 having at least a first side 520 having a first lateral edge 522a and a second lateral edge 522b opposite the first lateral edge. A first interface 524 is defined in housing 518. The first interface 524 includes a first alignment guide 526a defined along the first lateral edge 522a, and a second alignment guide 526b defined along the second lateral edge 522b. As shown in FIG. 10b, first and second alignment guides 526a and 526b are each configured to mate with a corresponding channel-like guide member on battery pack 528 (shown in FIG. 10a), and each comprise an elongate, flange-like guide member spanning substantially an entire length of the respective lateral edge 522a and 522b. A second interface 530 is also defined in housing 518. Both first and second interface 524 and 530 include a mechanical interface and an electrical interface.

The lower, the under, the beneath, the opposite side directly across from the top side of attachment, the belly, the lower end the male and female battery is a battery that is a hermaphrodite areas which has a male insertion area and the same female area. So that now you can attach a battery on top of each other and or more than one battery, two, three or four batteries that create stack on charging in series.

Which then opens the door to be able to install accessories attachments stack on in then which you can install car jumper cables to jump a car or install magnetic plate to hold into place which you can install all typed of applications this lower port or attachment process changes the entire way of using the power tool battery.

Now the battery becomes the tool and it is sandwiched between two other tools. Which also opens it up for other charging options so the cradle is an area for all types of attachments and future attachments opens the door to now make the battery unlimited potentials This application is able to be used for multiple tasks. The universal underneath cradle is use for countless tasks and attachments. For example a stack charger, a stack on battery charging or stack on disbursement of power to jump a car. Also to attach stabilization devices such as clamps clips magnets, hooks, cover plates The same developing company will mold this underneath their existing battery to create the top and bottom of a male and female entity to be able to charge a battery through the bottom of the port as well as the top of the male or female end also to be able to charge it in 6 different interfaces is a portal opening to a variety of options and accessories and unlimited capabilities.

The lower opening gives direct access to power as well as the top point. Thus opening an avenue to saving power and batteries and mostly saved the tool interchangeable, part tools accessories for use of all kind such as military, marine, land, homes, commercial, unions and emergencies.

FIG. 10a also shows an arrangement wherein battery packs can be configured to provide a 12 volt jumping system 504, useful for starting a vehicle or other battery powered device (large lawn mower, snow blower etc.).

FIG. 10a additionally shows a flip battery 506. The flip battery 506 utilizes two separate battery packs joined together back-to-back. Once one battery has been used, the flip battery 506 is removed, flipped over, and re-inserted, providing a fresh battery for the tool. This is especially useful in scenarios where a user is located on a roof or other inconvenient place where it would be time consuming or labor intensive to have to leave the area to get a fresh battery.

The installation of 2 batteries put together or there within 2 separate batteries combined together in any way to the same entity to create a 2nd stage power source after the first source is depleted.

Any combination of a single battery combined with a second single battery or a single battery divided to 2 batteries within 2 separate with drawer areas to remove power by taking out of the source and reinstalling the other end and or the other side and or the battery in full which then in theory a protective cover plate can be installed on the unused side Especially when a person such as on a roof or ladder can run out of power and does not have to leave the area or come down or even move different to finish last work to be done. He can just push a switch, slide a switch, turn a knob, twist the housing, squeeze the sided any combination of actuation or mechanical call of charging power to opposite or other source of power on the same housing of the area using tool not to leave to flip the battery to the other battery 2nd battery or 2nd; stage of 2 stages and or 2 layers as an emergency backup battery. The act of 2 powers joined together but separate take offs.

The sample of pictures on the exterior shell which can be 2 batteries to look like one or 2 as 2 or 1 battery to look as one with two powers interval.

So a person carries one battery but has two powers. Connected but separated and charge together or independently. So the flip battery as if is called or the 2 stage battery is its own ideas as on and or as 2 separate ides as the dual stage is a manufacturing process the fli battery is a no manufacturing just to install the same battery.

Together by glue, epoxy, snap weld, calk, fuse melt, spring rubber, mold manufactured in any way a back to back or bottom to bottom 2 entities in any way the same properties to the same tool and that install the flat plate for level and or options such as magnetic or extra light or just protection as follows which is obvious category and which is converted to layers.

FIG. 10a further shows a variety of charging devices for the battery pack. Besides the conventional charging station an arrangement is shown wherein multiple battery packs 508 are stacked one atop the other and all are charged at the same time. Additionally, a battery pack may be charged by a connection to a solar panel 510, by a connection to a cigarette lighter outlet 512 in a vehicle, by a conventional USB cable 514 or by a hand-operated cranking device (generator) 516.

The above described inventions provide several advantages over conventional devices. The above device saves time by indicating a current charge of a battery pack, by providing light when used with a power tool or as a standalone flashlight, and allow the battery pack to be charged by a plurality of different devices as well as providing charge to a plurality of devices. This will save time, the number of chargers needed and the number of batteries used in a household.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims.

What is claimed is:

1. A cordless power tool battery pack accessory comprising:
    a housing comprising at least a first side having a first lateral edge and a second lateral edge opposite the first lateral edge;
    a first interface defined on the first side of the housing comprising:
        a first mechanical interface comprising a first alignment guide defined along the first lateral edge and a second alignment guide defined along the second lateral edge, the first and second alignment guides being configured to slidably and detachably connect the accessory to a battery pack configured to slidably and detachably connect to a cordless power tool; and
        a first electrical interface comprising an electrical connection configured to electrically connect the accessory to the battery pack; and
    a second interface defined in the housing comprising:
        a second mechanical interface configured to mechanically and detachably connect the accessory to a first device; and
        a second electrical interface, in electrical communication with the first electrical interface, configured to electrically connect the accessory to the first device.

2. The apparatus accessory of claim 1 wherein said second interface comprises a female universal serial bus (USB) port.

3. The accessory of claim 1 wherein said first device comprises a mobile telecommunications device.

4. The accessory of claim 1 wherein said second interface comprises a female AC power plug.

5. The accessory of claim 1 further comprising a battery power gauge configured to provide a visual indication of a state of a charge in the battery pack.

6. The accessory of claim 1 further comprising a light source, wherein said light source is a light-emitting diode (LED).

7. The accessory of claim 1, wherein the first electrical interface is configured to receive power having direct current (DC), and wherein the second electrical interface is configured to supply power having direct current (DC).

8. The accessory of claim 1, wherein the first electrical interface is configured to receive electrical power having a voltage of approximately 12 to 24 volts.

9. The accessory of claim 1, further comprising a third interface defined in the housing comprising:
    a third mechanical interface configured to mechanically and detachably connect the accessory to a second device; and
    a third electrical interface, in electrical communication with the first electrical interface, configured to electrically connect the accessory to a second device.

10. The accessory of claim 9, wherein said third interface comprises a female universal serial bus (USB) port.

11. The accessory of claim 9, wherein the second device comprises a mobile telecommunications device.

12. The accessory of claim 1, wherein the accessory is configured to stack vertically relative to the battery pack.

13. The accessory of claim 1, wherein each of the first and second alignment guides comprises a flange-like guide member configured to mate with a corresponding channel-like guide member on the battery pack.

14. The accessory of claim 13, wherein the first alignment guide comprises an elongate, flange-like guide member spanning substantially an entire length of the first lateral edge, and the second alignment guide comprises an elongate, flange-like guide member spanning substantially an entire length of the second lateral edge.

15. The accessory of claim 1 further comprising a flashlight.

16. A method comprising connecting the cordless power tool battery pack accessory of claim 1 to a mobile telecommunications device via the second interface.

17. A cordless power tool battery pack accessory comprising:

a housing;
a first interface defined in the housing comprising:
  a first mechanical interface with at least one alignment guide configured to slidably and detachably connect the accessory to a battery pack configured to slidably and detachably connect to a cordless power tool; and
  a first electrical interface comprising an electrical connection configured to electrically connect the accessory to the battery pack; and
a second interface defined in the housing comprising:
  a second mechanical interface configured to mechanically and detachably connect the accessory to a device; and
  a second electrical interface, in electrical communication with the first electrical interface, configured to electrically connect the accessory to the device.

18. The accessory of claim 17, wherein said second interface comprises a female universal serial bus (USB) port.

19. The accessory of claim 17, wherein the device comprises a mobile telecommunications device.

20. The accessory of claim 17 further comprising a battery power gauge configured to provide a visual indication of a state of a charge in the battery pack.

\* \* \* \* \*

UNITED STATES PATENT AND TRADEMARK OFFICE
CERTIFICATE OF CORRECTION

PATENT NO. : 9,620,989 B2  
APPLICATION NO. : 14/208121  
DATED : April 11, 2017  
INVENTOR(S) : Michael J. Meoli Page 1 of 1

It is certified that error appears in the above-identified patent and that said Letters Patent is hereby corrected as shown below:

In the Claims  
Column 8, Line 18, after the word "The" and before the word "accessory", please delete the word "apparatus".

Signed and Sealed this  
Thirteenth Day of June, 2017

Joseph Matal  
*Performing the Functions and Duties of the*  
*Under Secretary of Commerce for Intellectual Property and*  
*Director of the United States Patent and Trademark Office*